March 9, 1965 H. BIEHL 3,172,764
PREPARATION OF FERMENTATION FODDER
Filed March 2, 1961
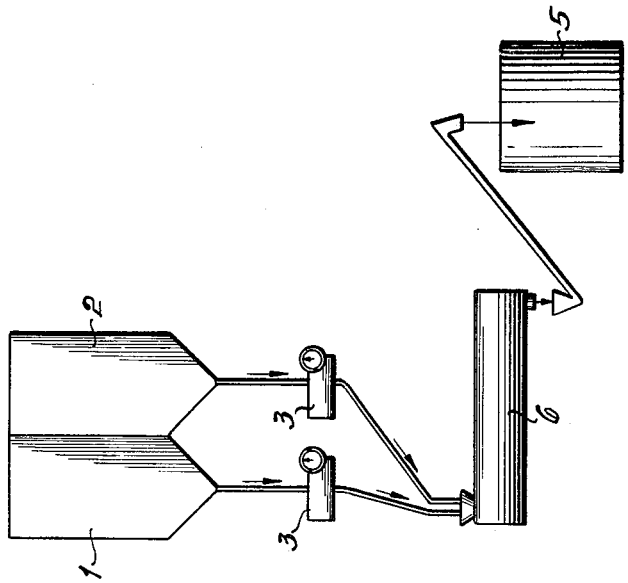
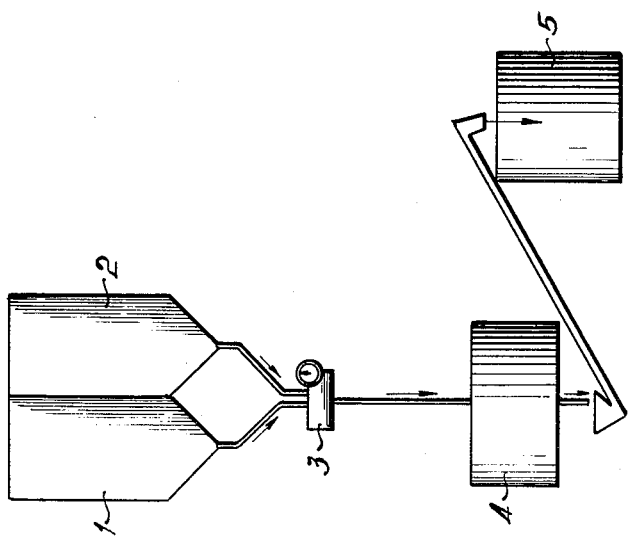
INVENTOR
Heinrich Biehl
By Beaman Beaman
attys United States Patent Office 3,172,764
Patented Mar. 9, 1965

3,172,764
PREPARATION OF FERMENTATION FODDER
Heinrich Biehl, Heinrichshof, near Trittau, Germany
Filed Mar. 2, 1961, Ser. No. 92,793
Claims priority, application Germany, Sept. 3, 1960,
B 59,229
9 Claims. (Cl. 99—8)

The storage in silos of fresh fodder materials, such as grass, sugar beet leaves and other leaves of nutritive value, sugar beets and other beets of nutritive value, and potatoes, serves to preserve these materials. However, during the natural process of fermentation, depending upon the particular raw material selected, various losses occur in the materials to be stored in silos, which losses can be very high. The preservation of potatoes and beets by storing them in stacks likewise brings about extremely high losses during storage. The extent of losses due to storage in silos depends substantially upon the water content of the raw material used and the manner in which the fermentation takes place.

Many attempts have been made to establish a lower pH value necessary for preservation, avoiding spontaneous acidification, by the addition of mineral or organic acids or salts thereof or mixtures of acids and salts thereof, or at least to influence spontaneous fermentation by displacing the pH value to the acid region.

Also, a process involving the initial withering of grass is known, in which, in order to obtain better storage in silos, fresh grass is caused to wither or dry to a water content of about 60 to 70%.

In all ensilage processes which have been accepted in practice, it is usual and advantageous to remove the juice evolved by the silage, whereby substances such as vitamins and mineral salts which are most valuable for feeding animals are lost. Also, with the usual additions, which are mostly acids or salts, the biological properties of the silage are not changed in comparison with fresh fodder.

Processes have already become known in which mother liquors which remain from the production of citric acid by fermentation and which not only contain various organic acids but also some sugar and protein substances, are to be used as addition agents for ensilaging green fodder. The use of these acids, however, is inhibited by the necessity for a complicated and relatively expensive glass packing, due to the liquid state of such agents, which is of particular importance due to the difficulty caused by handling the usual glass packing materials under agricultural circumstances. Known ensilage additives capable of being distributed, which usually consist of salts or complex compositions of the ensilaging acids, in contrast, do not contain any components which improve the food value of the ensilaged material. In addition, exact measurement and incorporation of small amounts of such agents into green fodder is not particularly easy and therefore is troublesome in agricultural usage.

An object of the present invention is to overcome these disadvantages and to produce a fermentation fodder by the addition of various dry components to green fodder, which may be distributed uniformly within green fodder in subsequent storage of the mixture in silos, wherein such fermentation fodder not only excludes any acid components liable to impair the health of the animals, but is also improved over green fodder with regard to its biological feeding value by a certain content of protein and starch substances as well as antibiotics.

According to the invention, a method is provided for the production of a fermentation fodder in which a mixture is produced comprising fresh fodder, dry substances containing starch and dry substances containing protein and is stored in a silo. Where the fresh fodder contains less than about 2% of sugar the mixture also includes dry substances containing sugar.

In carrying out the invention, the composition of the fermented fodder or of the raw material prepared for fermentation is selected so that:

(1) A water content of the silage of 50–75% is obtained, compared with a water content of the juicy fresh material of between 78 and 90%;
(2) A sugar content of at least 1–3% is obtained in the silage;
(3) A protein-starch ratio of about 1:4–1:10, preferably 1:6, is obtained in the finished fermentation fodder;
(4) The formation of lactic acid is enhanced in comparison with other acids.

Adjustment of the water content to 50–75%, as required under (1) above, is obtained by the addition of dry substances preferably containing starch, such as rough-ground grain (for instance, barley, rye, wheat, oats or maize) or tapioca meal (also known as cassava or manioca); in this manner, the total juice content is retained in the fermentation fodder.

The sugar content of at least 1–3% mentioned under (2) is obtained by the direct addition of sugar or dates or other sugar-containing fruits in accordance with the sugar content thereof, or by the addition of sugar-containing beet chips.

The preferred protein-starch ratio of about 1:6 mentioned under (3) is obtained by the addition of vegetable or animal proteins, for instance, extracted rough-ground soya meals (or other extracted rough-ground meals rich in proteins); fish meal (or other fish products), as well as meat meal and similar products made of meat or meat wastes.

The preferential fermentation of lactic acid mentioned under (4) is obtained on the one hand by the sugar addition provided and, furthermore, by adjustment to a favourable water content, by the usual anaerobic conditions in the silo and, in particular, by the addition of an antibiotic (up to 50 grams per ton) such as aureomycin, bacitracin or others.

When sugar-containing green fodder is ensilaged, for instance, sugar beets or other beets of nutritive value, the addition of sugar to the ensilaging agents may be eliminated. In carrying out the process of the invention, a new fodder forms during the course of the fermentation which suddenly occurs in the prepared substrate. This new fodder is much improved over previous fodders with regard to taste and utilization in the body of the animal. The biological value of the separate components employed is improved by about 10% when the composition is used in accordance with the invention, so that the gain obtainable from feeding is increased. Above all, the amount of fermentation losses is markedly decreased by the process mentioned. For instance, the water-soluble substances otherwise lost on drainage of juice remain in the fodder, so that ensilaging may be carried out without any juice drainage.

The table below shows the results obtained with tests when storing in a silo a sugar-containing green fodder and a green fodder practically free of sugar. The values shown under (a) were obtained without the addition of dry components with juice drainage, the values under (b) were obtained without the addition of dry components and without juice drainage, and those under (c) were obtained with storage in a silo in accordance with the invention.

Table

| Green fodder | | Mixture of dry components | | Loss of dry mass, percent | Acidic condition | | | | Utilization of the fodder by animals |
| --- | --- | --- | --- | --- | --- | --- | --- | --- | --- |
| Kind | Amount of material stored in the silo, percent | Composition | Amount in silo, percent | | pH-value | Lactic acid, percent | Acetic acid, percent | Butyric acid, percent | |
| Beets of nutritive value. | | 80% tapioca-meal. 20% rough-ground soya. 40g./ton aureomycin. | | | | | | | |
| | (a) 100 | | | 46 | 4.1 | 0.4 | 0.7 | | |
| | (b) 100 | | | 25 | 4.0 | 0.16 | 1.0 | | 10% better than with (a) and (b) calculated on the percentage of beets in the fodder. |
| | (c) 75 | | 25 | 5 | 3.85 | 1.7 | 0.25 | | |
| Grass | | 78% tapioca-meal. 16% dates. 6% rough-ground soya meal. 40g./ton aureomycin. | | | | | | | |
| | (a) 100 | | | 10.5 | 5.1 | 0.4 | 0.7 | | |
| | (b) 100 | | | 6.1 | 4.8 | 0.55 | 0.65 | 0.01 | About 20% better than with (a) and (b) or with fresh grass calculated on the percentage of grass in the fodder. |
| | (c) 75 | | 25 | 3.2 | 3.65 | 1.85 | ,0.2 | | |

Examples of the composition of the dry components of the mixture are:

For grass—
  82% of tapioca meal;
  12% of high-grade sugar beet chips;
  6% of rough-ground, extracted soya meal, containing 4.0 grams of aureomycin per 100 kilos; or 72% of rough-ground rye meal;
  28% of tapioca and date product consisting of 60% of dates and 40% of tapioca meal, containing 4.0 grams of aureomycin per 100 kilos; or 72% of rough-ground Indian corn (maize);
  16% of tapioca meal;
  12% of high grade sugar beet chips containing 4.0 grams of aureomycin per 100 kilos;

For beets—
  80% of tapioca meal;
  20% of rough-ground, extracted soya meal, containing 4.0 grams of aureomycin per 100 kilos; or 80% of rough-ground rye meal;
  16% of tapioca meal;
  4% of rough-ground extracted soya meal, containing 4.0 grams of aureomycin per 100 kilos; or 50% of rough-ground barley meal;
  42% of tapioca meal;
  8% of fresh meal, containing 4.0 grams of aureomycin per 100 kilos;

For potatoes—
  73% of tapioca meal;
  27% of fish meal, containing 6.7 grams of aureomycin per 100 kilos; or 50% of rough-ground rye meal;
  35% of rough-ground, extracted soya meal;
  15% of tapioca meal, containing 6.7 grams of aureomycin per 100 kilos;

For beet leaves—
  60% of tapioca meal;
  28% of tapioca and date mixture (as above);
  12% of rough-ground, extracted soya meal, containing 4.0 grams of aureomycin per 100 kilos; or 50% of rough-ground rye meal;
  22% of rough-ground Indian corn (maize);
  28% of tapioca and date mixture (as above), containing 4.0 grams of aureomycin per 100 kilos.

For any one type of fresh substance to be ensilaged, a correspondingly formulated mixture of dry components and auxiliary substances is made up and added in a ratio of about 75% of fresh substance and 25% of dry components. With respect to potatoes, a ratio of 85% and 15% of dry components has been proved to be most suitable. These components are then intimately mixed when stored in the silo, either in a separate mixing process or directly while being charged into the silo while preserving the requisite mixing ratio. Methods of operation suitable for working on a large scale are illustrated by way of example in the accompanying drawing, in which:

FIG. 1 shows one embodiment of the invention in flow diagram form;

FIG. 2 shows an alternative embodiment of the process of the invention, likewise in flow diagram form.

In FIGS. 1 and 2, a storage container for fresh fodder is shown at 1 and a storage container for premixed dry components is shown at 2. The material for storage arrives, in FIG. 1, in a charge blender 4 via one or more measuring devices 3, which, for instance, may be weighing machines, and is intimately mixed in the charge blender 4. From this charge blender, the material is directly fed, for instance, via a conveyor belt, to a silo 5 in which it is ensilaged. If several silos are charged at the same time, it is preferable to mix the fresh fodder and the dry components, as shown in FIG. 2, in a continuous mixer 6 and to charge them into the silos via a movably arranged portion feeder 7.

The reduction of the fermentation losses is attributable to the reduction of the water content, the influence of the fermentation and the combination of albumin protein and starch components. The reduction of the water content also accounts for the positive influence on the fermentation process, apart from the antibiotics which, with the exception of lactic acid fermentation, largely avoids decomposition reactions. The reason for the especially effective utilisation of the fermentation fodder by animals is the common fermentation of various fodder components, whereby a new fodder is created by biological "disclosure."

With the process described, there are no losses of any kind and, instead, there is a gain of about 15% or even 30% and more, in contrast to existing methods.

The results set forth above have been verified in a number of many small fermentation tests and in silo tests on a larger scale with subsequent feeding tests with several hundreds of pigs.

What I claim is:

1. A method for producing a fermented fodder from juicy green fodder, said juicy green fodder having a water content of between 78 and 90% and a starch-protein ratio greater than 10 to 1, comprising the steps of adding to said juicy green fodder a first dried comminuted starchy fodder and a second dried comminuted proteinaceous fodder to form a mixture having a starch-protein ratio of between 4 to 1 and 10 to 1 and a water content of 50 to 75%, and fermenting said mixture under anaerobic conditions.

2. A method as claimed in claim 1, in which said mixture has a starch-protein ratio of about 6 to 1.

3. A method for producing a fermented fodder from a juicy green fodder, said juicy green fodder having a water content of between 78 and 90% and a starch-protein ratio of more than 10 to 1, comprising the steps of adding to said juicy green fodder a first dried comminuted starchy fodder selected from the class consisting of coarse ground grains of dried cereals and bulbs of tuberous plants, and a second dried comminuted proteinaceous fodder selected from the class consisting of fish, wastes of meat and soybeans, to form a mixture having a starch-protein ratio between 4 to 1 and 10 to 1 and a water content of 50 to 75% and fermenting said mixture under anaerobic conditions.

4. A method as claimed in claim 3, in which said mixture as a starch-protein ratio of about 6 to 1.

5. A method as claimed in claim 3, in which said proteinaceous fodder is fish.

6. A method as claimed in claim 3, in which said proteinaceous fodder is wastes of meat.

7. A method as claimed in claim 3, in which said proteinaceous fodder is soybeans.

8. A method as claimed in claim 3, in which said starchy fodder is rough ground grains of dried cereals.

9. A method as claimed in claim 3, in which said starchy fodder is bulbs of tuberous plants.

References Cited by the Examiner

UNITED STATES PATENTS

| 2,299,745 | 10/42 | Hensen | 99—9 |
| 2,890,956 | 6/59 | Bonda. | |
| 2,940,857 | 6/60 | Andrews | 99—8 |

A. LOUIS MONACELL, *Primary Examiner.*